(12) United States Patent
Ooe (10) Patent No.: US 8,978,874 B2
(45) Date of Patent: Mar. 17, 2015

(54) FRICTION DRIVE CARRIAGE-TYPE CONVEYING APPARATUS

(71) Applicant: Masahiro Ooe, Shiga (JP)

(72) Inventor: Masahiro Ooe, Shiga (JP)

(73) Assignee: Daifuku Co., Ltd. (JP)

( * ) Notice: Subject to any disclaimer, the term of this patent is extended or adjusted under 35 U.S.C. 154(b) by 32 days.

(21) Appl. No.: 13/913,129

(22) Filed: Jun. 7, 2013

(65) Prior Publication Data

US 2014/0360841 A1    Dec. 11, 2014

(51) Int. Cl.
| | |
|---|---|
| *B65G 35/00* | (2006.01) |
| *B65G 35/06* | (2006.01) |
| *B65G 13/02* | (2006.01) |
| *B65G 19/02* | (2006.01) |

(52) U.S. Cl.
CPC ...................................... *B65G 19/02* (2013.01)
USPC ...................................................... 198/465.1

(58) Field of Classification Search
None
See application file for complete search history.

(56) References Cited

U.S. PATENT DOCUMENTS

| | | | | |
|---|---|---|---|---|
| 5,012,917 A | * | 5/1991 | Gilbert et al. .............. | 198/465.2 |
| 6,749,055 B2 | * | 6/2004 | Takano et al. .............. | 198/465.2 |

FOREIGN PATENT DOCUMENTS

| | | |
|---|---|---|
| JP | H0733009 A | 2/1995 |
| JP | 2003191839 A | 7/2003 |

* cited by examiner

*Primary Examiner* — Kavel Singh
(74) *Attorney, Agent, or Firm* — St. Onge Steward Johnston & Reens LLC (57) ABSTRACT

A friction drive carriage-type conveying apparatus in which a conveying carriage is constituted of a plurality of carriage units to located in series in a moving direction of the conveying carriage, and the respective carriage units to are connected at one of left and right lateral side portions of the conveying carriage in a straightforward posture so as to be horizontally bendable about vertical joint axes and positioned on a straight line parallel to the moving direction, and a friction drive load bar is constituted of a plurality of load bar units to divided for every carriage unit to and attached at positions on the straight line, and the respective load bar units are horizontally bendable about the joint axes.

10 Claims, 10 Drawing Sheets

FRICTION DRIVE CARRIAGE-TYPE CONVEYING APPARATUS

FIELD OF THE INVENTION

The present invention relates to a friction drive carriage-type conveying apparatus composed of a conveying carriage having a friction drive load bar provided along a moving direction and a friction drive means arranged on a moving path of the conveying carriage and having a friction drive wheel pressure-contacting with the load bar.

BACKGROUND OF THE INVENTION

As the friction drive carriage-type conveying apparatus having the above configuration, as described in Patent Document 1, for example, there has been known a conveying apparatus configured such that a plurality of load bar units located in series along a moving direction are connected horizontally bendable about vertical joint axes to constitute a friction drive load bar, and a conveyed object support base is supported by one of the plurality of load bar units, for example, a central load bar positioned in the center in the longitudinal direction of the friction drive load bar, and trolleys which support both ends in the longitudinal direction of the friction drive load bar and positions of joint axes in between are supported on a guide rail laid along the moving path side so as to be capable of traveling, and the friction drive load bar is friction-driven by a friction drive wheel of a friction drive means arranged on the moving path, whereupon the conveyed object support base is moved along the moving path. In the conveying apparatus described in Patent Document 1, the conveying carriage is composed of the conveyed object support base, the central load bar unit supporting the conveyed object support base, and front and rear two trolleys supporting the central load bar unit. Meanwhile, as shown in Patent Document 2, there has been also known a friction drive carriage-type conveying apparatus configured by attaching one of the load bar units (for example, the central load bar unit) of the friction drive load bar as described in Patent Document 1 to one of left and right lateral side portions of the conveying carriage having wheels.

Patent Document 1: Japanese Published Unexamined Patent Application No. H07-33009

Patent Document 2: Japanese Published Unexamined Patent Application No. 2003-191839

In the well-known friction drive carriage-type conveying apparatuses described in Patent Documents 1 and 2, a horizontally bendable friction drive load bar having a joint axis at an intermediate position in the longitudinal direction is used. Therefore, as compared with a friction drive method of sandwiching the conveying carriage itself by a friction drive wheel and back-up roller of a friction drive means, there is no need to enhance the strength of the conveying carriage for friction drive. Further, such an effect can be obtained that the moving direction of the conveying carriage can be changed by providing a horizontal curved path section in the moving path without turning the moving direction of the conveying carriage through the use of a turntable. However, when a conveying traveling body composed of the friction drive load bar and the conveying carriage travels in the closest state of adjoining front and rear conveying traveling bodies thereof, it is necessary for conveyed objects (for example, automobile vehicle bodies) loaded on corresponding conveying carriages to be configured so as not to interfere with each other by making the entire length of the conveying traveling body longer than the entire length of the conveyed object loaded on the conveying carriage. Therefore, when work floor surface portions projecting forward and rearward from the conveyed object are intended to be secured at both front and rear end portions of the conveying carriage, the entire length of the conveying carriage needs to be made substantially as long as the entire length of the friction drive load bar.

As a result, a long and heavyweight integral conveying carriage is required. Coupled with the need to configure the conveying carriage such that the conveying carriage having been divided for truck transportation can be assembled at an installation site, costs of the conveying carriage are significantly increased. In addition, on the occasion when the friction drive load bar having a bendable joint structure in relation to the horizontal direction is friction-driven along the horizontal curved path section, both front and rear end portions of the conveying carriage protruding forward and rearward from both front and rear ends of the load bar units attached to the conveying carriage project greatly outward from a center line of the horizontal curved path section along which the friction drive load bar moves while being bent. As a result, a floor area necessary for the moving path of the conveying carriage at the horizontal curved path section becomes remarkably large.

SUMMARY OF THE INVENTION

The present invention proposes a friction drive carriage-type conveying apparatus capable of solving the foregoing conventional problems. Described by giving reference symbols in parentheses used in descriptions of embodiments described later in order to facilitate understanding the relationship with the embodiments, a friction drive carriage-type conveying apparatus according to the present invention includes a conveying carriage (1) having a friction drive load bar (11) provided in parallel with a moving direction so as to continue over an entire length of the carriage, and a friction drive means (25) arranged on a moving path side of the conveying carriage (1) and having a friction drive wheel (26) pressure-contacting with the friction drive load bar (11), wherein the conveying carriage (1) is constituted of a plurality of carriage units (2 to 4) located in series in the moving direction thereof, and the respective carriage units (2 to 4) are connected at one of left and right lateral side portions of the conveying carriage (1) in a straightforward posture so as to be horizontally bendable about vertical joint axes (18b and 19b) positioned on a straight line parallel to the moving direction, and the friction load bar (11) is constituted of a plurality of load bar units (12a to 12c) divided for every carriage unit (2 to 4), and the respective load bar units (12a to 12c) are attached to the corresponding carriage units (2 to 4) at the positions on the straight line and are horizontally bendable about the joint axes (18b and 19b) between the carriage units (2 to 4).

Hereinafter, preferred specific configurations where the foregoing present invention is carried out will be recited.

Specific configuration 1: The respective load bar units (12a to 12c) of the friction drive load bar (11) can be connected horizontally bendable by vertical spindles (18a and 19a) concentric with the joint axes (18b and 19b) between the carriage units (2 to 4). The respective carriage units (2 to 4) of the conveying carriage (1) can be connected with the load bar units (12a to 12c) having been attached thereto, via the vertical spindles (18a and 19a) so as to be horizontally bendable.

Specific configuration 2: The joint axes (18b and 19b) between the load bar units (12a to 12c) having been attached to the respective carriage units (2 to 4) of the conveying carriage (1) can be arranged at positions that coincide with either front or rear adjacent carriage units (2 to 4) rather than positions between the front and rear carriage units (2 to 4). This specific configuration 2 can be carried out in combination with the foregoing configuration of the present invention or the specific configuration 1.

Specific configuration 3: Guide rollers (16 to 19) each of which is rotatable about vertical axes can be pivotally supported to the friction drive load bar (11) at both end portions thereof and the joint axes (18b and 19b) positions in between, and a guide rail (24) with which the respective guide rollers (16 to 19) are engaged can be arranged on the moving path side (for example, at least at a horizontal curved path section) of the conveying carriage (1). This configuration can be carried out in combination with any one of the configurations of the present invention, the specific configuration 1, and the specific configuration 2.

Specific configuration 4: The conveying carriage (1) can be composed of three carriage units (2 to 4) located in series, and the central carriage unit (2) can be provided with a conveyed object support base (9a, 9b) and an elevation drive means (10) for the conveyed object support base (9a, 9b), and the both front and rear carriage units (3 and 4) can be provided with work floor surfaces (3a and 4a) projecting further forward and rearward than both front and rear ends of a conveyed object (W) having been supported on the conveyed object support base (9a, 9b), and the elevation drive means (10) can be protrudingly provided below the central carriage unit (2) at a position away from the load bar unit (12b) attached to the central carriage unit (2) toward a carriage center side. This configuration can be carried out in combination with any one of the configurations of the present invention and the specific configurations 1 to 3.

Specific configuration 5: The conveying carriage (1) can be provided with a second friction drive load bar (34) at a lateral side portion opposite to the lateral side portion to which the friction drive load bar (11) is attached, and the second friction drive load bar (34) can be composed of load bar units (35a to 35c) separately attached to the respective carriage units (2 to 4) so as to be located in series on a straight line parallel to the moving direction at the time when the conveying carriage (1) is in the straightforward posture, and a second friction drive means (36) acting upon the second friction drive load bar (34) can be arranged at a linear moving path section in the moving path of the conveying carriage (1), aside from the friction drive means (25). This configuration can be carried out in combination with any one of the configurations of the present invention and the specific configurations 1 to 4.

Specific configuration 6: The conveying carriage (1) can be provided with a connectable and disengageable connecting means (37a, 37b) capable of connecting front and rear adjacent carriage units (2 to 4) with each other at a lateral side portion opposite to the lateral side portion to which the friction drive load bar (11) is attached, and an operation means (a cam rail 46) switching the connecting means (37a, 37b) to a disengaged state can be arranged at least before a horizontal curved path section (31A, 31B) in the moving path of the conveying carriage (1). This configuration can be carried out in combination with any one of the configurations of the present invention and the specific configurations 1 to 5.

Specific configuration 7: When the foregoing specific configuration 6 is adopted, the connecting means (37a, 37b) can be an automatic connecting means automatically switched to a connected state when the front and rear carriage units (2 to 4) are returned to the straightforward posture from a bent posture of swinging about the joint axes (18b and 19b), and the connecting means can be provided with an operated portion (a cam follower roller 45) for switching from the connected state to the disengaged state, and a cam rail (46) operating the operated portion (the cam follower roller 45) and switching the automatic connecting means (37a, 37b) from the connected state to the disengaged state can be arranged as the operation means at least at a transitional zone from the linear moving path section to the horizontal curved path section in the moving path of the conveying carriage (1).

According to the configuration of the present invention, even where a conveying carriage used in an automobile assembly line, that is, a long conveying carriage provided with work floor surfaces protruding forward and rearward from the front and the rear of a loaded vehicle body is used, the conveying carriage can be constituted of a plurality of carriage units located in series in a moving direction of the conveying carriage. Therefore, each carriage unit can be limited in its size to the one which can be transported by truck as it is. Additionally, the respective carriage units are only connected horizontally bendable about vertical joint axes but not rigidly coupled and integrated into one conveying carriage on site. Thus, even a long conveying carriage in its entirety can be implemented relatively at a low cost. Particularly, where the conveying carriage used in the automobile assembly line is configured such that both front and rear carriage units having work floor surfaces projecting further forward and rearward than both front and rear ends of a conveyed object having been supported on a conveyed object support base provided to a central carriage unit are connected with the front and the rear of the central carriage unit so as to be bendable about joint axes, a strength necessary to safely support and convey the automobile vehicle body can be given to the central carriage unit, and the strength of the both front and rear carriage units can be set lower than the central carriage unit to configure the both front and rear carriage units. As a result, a weight reduction of the entire conveying carriage can be promoted, and furthermore, a cost reduction can be promoted.

Additionally, the respective carriage units are connected at one of left and right lateral side portions thereof so as to be horizontally bendable about vertical joint axes. As compared with the occasion of being connected on a center line passing through a middle position in a left-right width direction so as to be horizontally bendable, the horizontal turning direction of the conveying carriage is restricted to one of left and right sides. However, there is no need to provide, between front and rear adjacent carriage units, a space or overlap for allowing horizontal bending movement between the front and rear adjacent carriage units. Floor surfaces of the front and rear adjacent carriage units can be butted flush throughout the entire width from left to right on the linear moving path section mainly used as a work line. There is no possibility of adversely affecting safety of work on the conveying carriage.

As a result of arranging the joint axes between the carriage units at one of left and right lateral side portions of the respective conveying carriage, the friction drive load bar horizontally bendable about the joint axes is arranged at one of left and right lateral side portions of the conveying carriage. Consequently, the friction drive load bar and the friction drive means on the moving path side are arranged at one of left and right lateral side portions of the moving path of the conveying carriage. Therefore, as compared with the configuration that the friction drive load bar and the friction drive means on the moving path side are arranged at a middle position in the left-right width direction of the conveying carriage, maintenance of the friction drive load bar and the friction drive means is facilitated.

It is also possible to configure such that the respective carriage units are connected horizontally bendable about the foregoing joint axes and that the respective load bar units constituting the friction drive load bar are attached to the respective carriage units on a straight line passing through the joint axes. According to the specific configuration 1, however, the horizontally bendable friction drive load bar having the joint axes in between itself is used as connecting means between the carriage units as well. Assembly of the conveying traveling body composed of the friction drive load bar and the conveying carriage is facilitated.

Each load bar unit constituting the friction drive load bar is preferably attached to the bottom surface of one of left and right lateral side portions of each carriage unit. On this occasion, however, the position of the joint axis between the load bar units is necessarily shifted inside the side of the carriage unit at least by a distance half of the left-right width of the load bar unit. As a result, where the joint axis is positioned between the front and rear adjacent carriage units (at a position adjacent to both front and rear sides of both carriage units), corner portions of the both front and rear lateral sides of the front and rear adjacent carriage units need to be cut into the shape of a circular arc with a small curvature in order that the corner portions of the both front and rear sides of the carriage units do not interfere with each other when the conveying carriage horizontally turns and travels toward the side at which the friction drive load bar is located at the horizontal curved path section. According to the specific configuration 2, however, great distances from the joint axis to the both front and rear lateral sides of the carriage units can be obtained, and thus, the foregoing interference can be avoided within the range of clearance between the both front and rear lateral sides of the carriage units. Even where the corner portions of the both front and rear lateral sides of the carriage units are cut off, only slight cutting in the shape of a circular arc with a large curvature will do.

Particularly, where the conveying carriage is constituted of three carriage units located in series, and where the central carriage unit becomes longer than the front and rear carriage units in relation to providing the object support table on the central carriage unit, restrictions on structure and arrangement of the friction drive means for driving the conveying carriage to travel and pass through the horizontal curved path section are increased if a load bar unit of the friction drive load bar attached to the central carriage unit becomes longer. At such time, as following the specific configuration 2, the lengths of the load bar units attached to the front and rear carriage units are made longer than the entire lengths of the front and rear carriage units, and the length of the load bar unit attached to the central carriage unit is made shorter than the entire length of the central carriage unit. Then, the difference in length of the respective load bar units can be kept small, which is advantageous.

In the configuration of the present invention, the conveying carriage is friction-driven by friction drive means arranged on the moving path side and then travels. The moving direction of the conveying carriage at that moment needs to be controlled by some kind of means. For example, the moving direction of the conveying carriage can be controlled by a guide rail on the moving path side engaged with wheels of the conveying carriage. According to the specific configuration 3, the moving direction of the conveying carriage friction-driven and traveling can be controlled by guide rollers provided to the friction drive load bar and a guide rail on the moving path side. In other words, laying of the guide rail engaged with the wheels of the conveying carriage on the floor surface no longer becomes an essential requirement. The control over the moving direction of the conveying carriage particularly at the horizontal curved path section becomes easy, and implementation of equipment can be carried out easily and at a low cost. It is noted that the specific configuration 3 does not need to be implemented throughout the entire moving path of the conveying carriage including the linear moving path section, and can be implemented only at a specific zone, for example, the horizontal curved path section.

Where the conveying apparatus is used as a friction drive carriage-type conveying apparatus for an automobile assembly line requiring a conveyed object support base, an elevation drive means for the conveyed object support base, and work floor surfaces projecting further forward and rearward than both front and rear ends of a conveyed object having been supported on the conveyed object support base, according to the specific configuration 4, a strength necessary to safely support and convey the automobile vehicle body can be given to the central carriage unit provided with the conveyed object support base and the elevation drive means for the conveyed object support base, and the strength of the both front and rear carriage units can be set lower than the central carriage unit to configure the both front and rear carriage units. In addition to that, the elevation drive means mounted to the central carriage unit is provided in such a manner so as to protrude below the central carriage unit irrespective of the friction drive load bar. Therefore, as compared with the occasion when the foregoing elevation drive means needs to be installed on the central carriage unit, a lower space of the central carriage unit can effectively be utilized and the height above the floor surface in an occupied space necessary for the conveying path can be lowered.

In the configuration of the present invention, the friction drive load bar is arranged at one of left and right lateral side portions of the conveying carriage. Thus, even where the straight traveling stability of the conveying carriage is secured by the guide rail engaged with the wheels of the conveying carriage or the guide rail engaged with the guide rollers of the friction drive load bar as in the specific configuration 3, a large left-right lateral frictional force acts upon the guide rail when the conveying carriage is driven by the friction drive means on the moving path side and is traveled at the linear moving path section. Adverse effects such as shortening of useful life longevity of wheels, guide rollers, guide rails, etc., arise. According to the specific configuration 5, however, the conveying carriage can be friction-driven at the linear moving path section via the pair of left and right friction drive load bars arranged on the both left and right lateral side portions of the conveying carriage, respectively, and there becomes no chance that a left-right lateral force may act upon the conveying carriage side along with the friction drive. The conveying carriage can be smoothly traveled linearly, and the above-described concern about the shortening of useful life longevity of wheels, guide rollers, guide rails, etc., can be eliminated as well.

In addition, according to the specific configuration 6, a plurality of carriage units located in series in the front-rear direction can be connected with each other by connecting means and constitute an unbendable integral conveying carriage in the linear moving path section. Therefore, for example, where a passage crossing the linear moving path section needs to be provided, the need to arrange a guide rail guiding the conveying carriage and a friction drive means within the passage is eliminated by limiting the passage width to the extent that the conveying carriage can pass through the passage reliably by the friction drive means arranged before and after the passage. Safety of the passage can be thereby enhanced. As a matter of course, the connecting means are automatically switched to the disengaged state when the conveying carriage arrives in front of the horizontal curved path section. Thus, the conveying carriage can be traveled by friction drive also at the horizontal curved path section as intended.

It is noted that where the specific configuration 6 is carried out, the respective carriage units may be connected by the connecting means only at a specific zone in the linear moving path section or may be connected by the connecting means throughout the whole linear moving path section. Further, the connecting means is switched to the disengaged state by the operation means on the moving path side. The switching of the connecting means having been switched to the disengaged state back to the connected state again may also be carried out by an operation means provided on the moving path side. According to the specific configuration 7, however, only a cam rail as the operation means is arranged at a transitional zone from the linear moving path section to the horizontal curved path section, for example, whereby the connecting means of the conveying carriage moving over the horizontal curved path section can automatically be switched to the disengaged state, and the respective carriage units of the conveying carriage can be bent and passed through the horizontal curved path section without any problem. The connecting means of the conveying carriage moving from the horizontal curved path section into the downstream linear moving path section can automatically be returned to the connected state through the switching motions of the carriage units of the conveying carriage from the bent posture to the straight-forward posture, without providing any particular operation means on the moving path side.

BRIEF DESCRIPTION OF THE DRAWINGS

FIG. 4A-4B is a plan view of a friction drive load bar.

DETAILED DESCRIPTION OF THE INVENTION

A conveying carriage 1 is constituted of a central carriage unit 2 positioned in the center in a moving direction and a front carriage unit 3 and a rear carriage unit 4 adjacent in front and in the rear of the central carriage unit 2, as shown in FIGS. 1 to 4. Front and rear two pairs of left and right caster wheels 6 to 8 rolling on a pair of left and right guide rails 5a and 5b laid along the moving path are attached to each of the carriage units 2 to 4. A pair of front and rear conveyed object support bases 9a and 9b and an elevation drive means 10 parallelly moving both conveyed object support bases 9a and 9b up and down are provided to the central carriage unit 2.

Since elevation drive means having various structures are well-known, an illustration and a description of the structure of the elevation drive means 10 will be omitted. The elevation drive means 10 is constituted of, for example, a pantograph linkage parallelly and elevatably supporting the conveyed object support bases 9a and 9b, and an elevation drive device composed of a fluid pressure cylinder unit, motor-driven screw jack or push-up and pull-down chain rise-fall driving the pantograph linkage. The elevation drive means 10 is provided in such a manner so as to protrude below the central carriage unit 2 so that the conveyed object support bases 9a and 9b can descend to a work floor surface 2a of the central carriage unit 2.

A conveyed object (for example, an automobile vehicle body) W supported on the conveyed object support bases 9a and 9b protrudes from both front and rear ends of the central carriage unit 2 so as to be overlaid on both front and rear carriage units 3 and 4 in plan view. The both front and rear carriage units 3 and 4 are respectively formed with work floor surfaces 3a and 4a with respect to both front and rear end portions of the conveyed object W protruding on the both front and rear carriage units 3 and 4. As a matter of course, the work floor surfaces 3a and 4b of the both front and rear carriage units 3 and 4 are configured to continue flush with the work floor surface 2a of the central carriage unit 2.

The respective carriage units 2 to 4 of the conveying carriage 1 are connected by a friction drive load bar 11 attached to the bottom surface thereof along one of left and right lateral side portions thereof. The friction drive load bar 11 has an entire length almost the same as the entire length of the conveying carriage 1 and is constituted of three load bar units 12a to 12c to be separately attached to the respective carriage units 2 to 4. The front load bar unit 12a to be attached to the front carriage unit 3 has a length longer than the entire length of the front carriage unit 3 and is attached in such a manner so as to protrude from the front end of the bottom surface of the front carriage unit 3 to below the central carriage unit 2 along one lateral side of the front carriage unit 3. The rear load bar unit 12c to be attached to the rear carriage unit 4 has a length longer than the entire length of the rear carriage unit 4 and is attached in such a manner so as to protrude from the rear end of the bottom surface of the rear carriage unit 4 to below the central carriage unit 2 along one lateral side of the rear carriage unit 4. The central load bar unit 12b to be attached to the central carriage unit 2 has a length shorter than the entire length of the central carriage unit 2 and is attached on the bottom surface of the central carriage unit 2 along one lateral side of the central carriage unit 2 so as to connect between the front and rear load bar units 12a and 12c.

Figure 1:
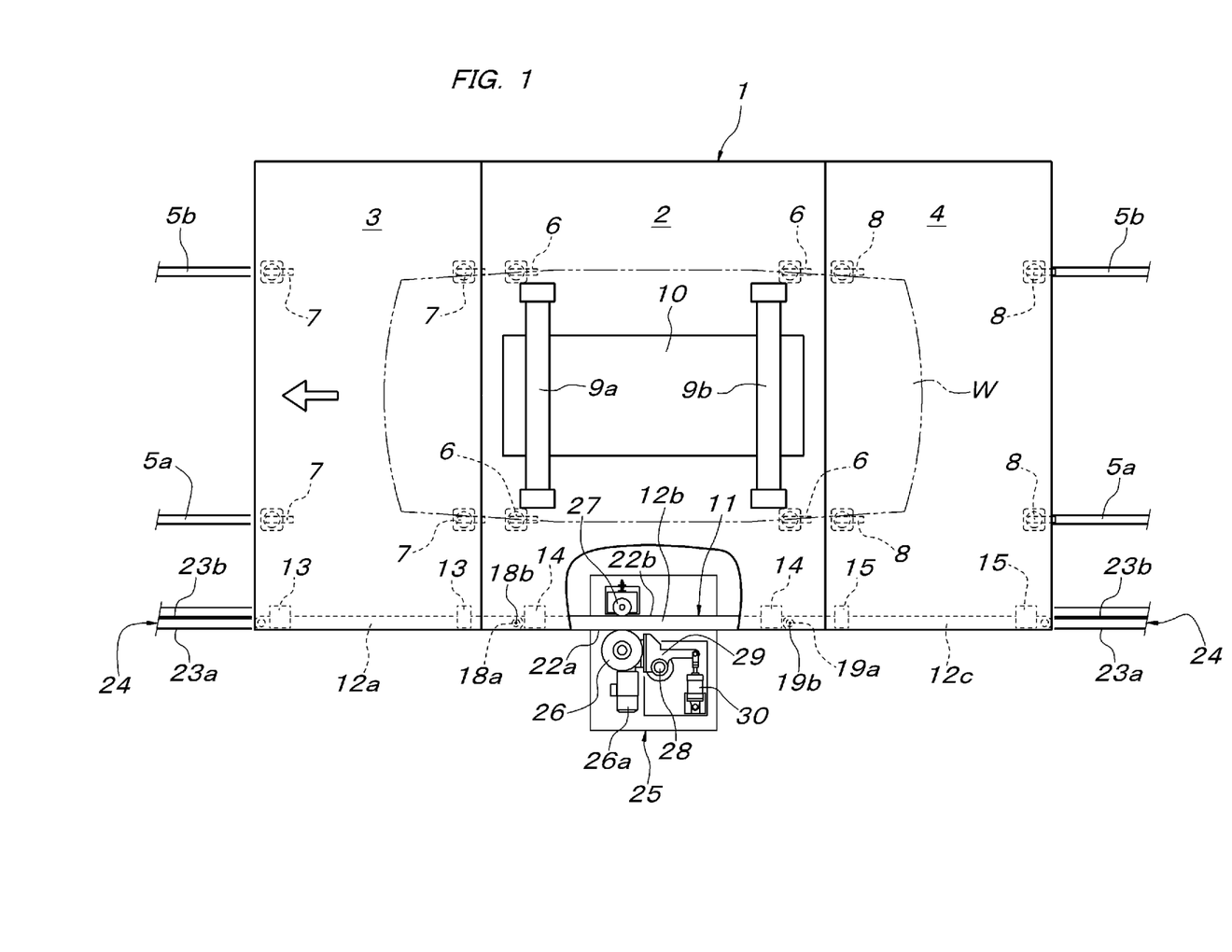
FIG. 1 is a partially cutaway plan view.
Figure 2:
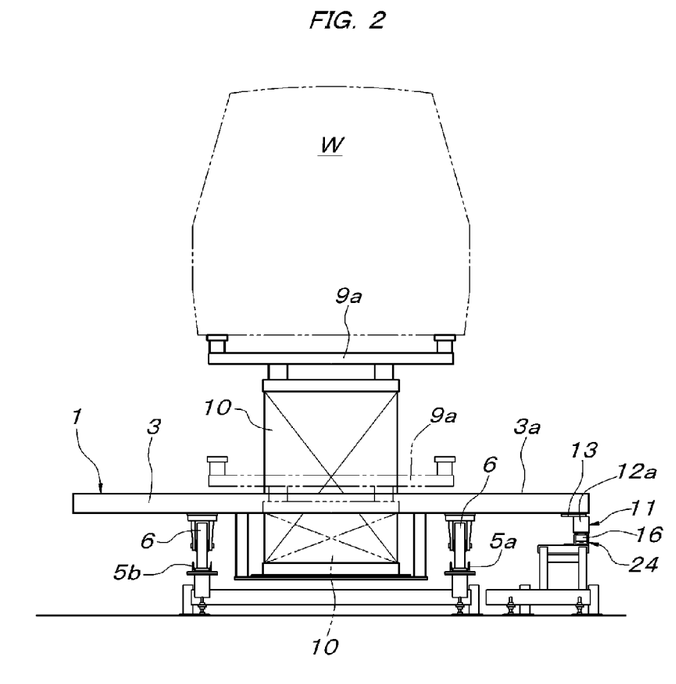
FIG. 2 is a front view excluding a friction drive means on a moving path.
Figure 3:
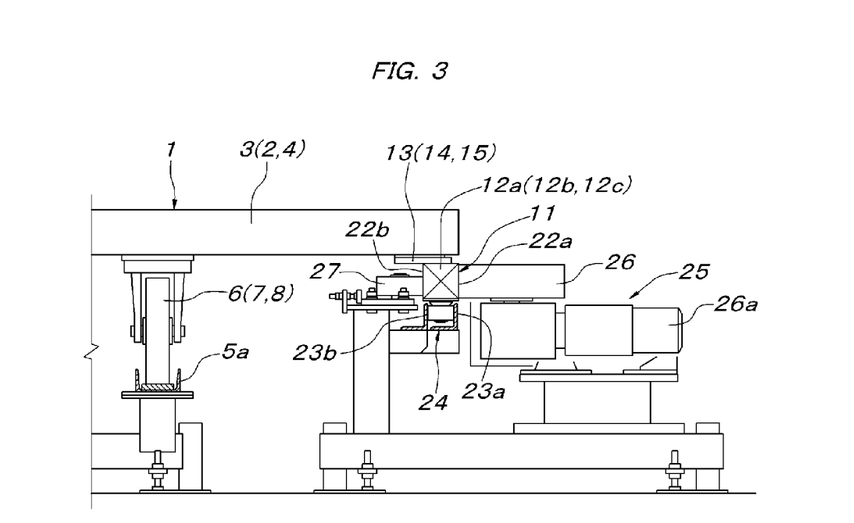
FIG. 3 is a front view showing main parts of a friction drive means and a conveying carriage.
Figure 4A:
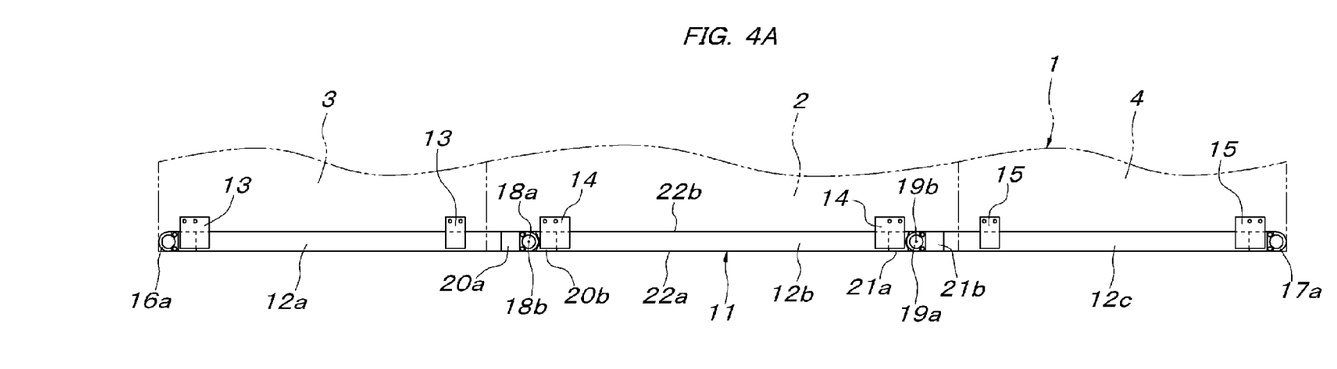
Figure 4B:
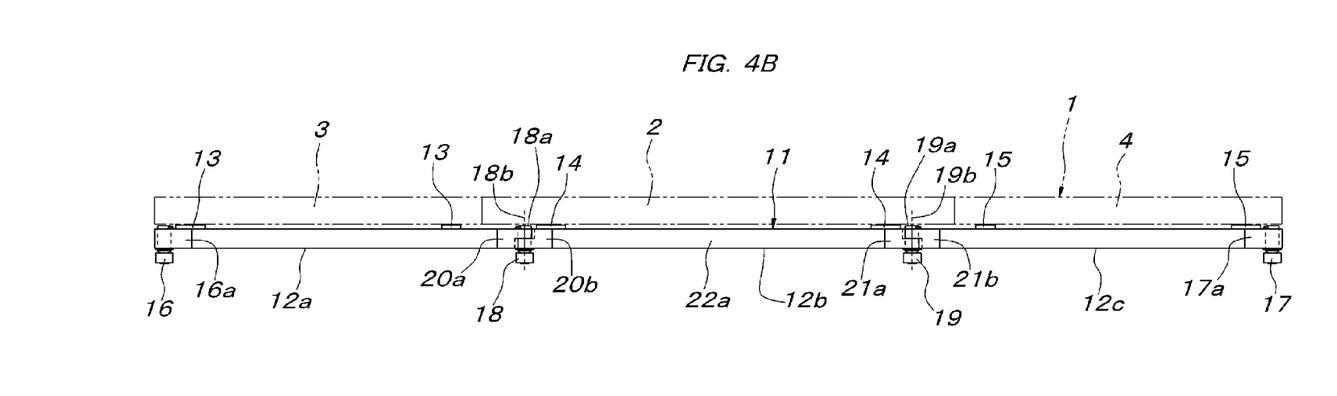

A more detailed description will be given. As shown in FIG. 4A-4B, the load bar unit 12a to 12c is each formed of a rod member whose cross-sectional profile is square. Mounting plates 13 to 15 for bottom surfaces of the carriage units 2 to 4 are fixed on corresponding upper surfaces around both ends of the load bar units 12a to 12c so as to protrude inward. Bearing members 16a and 17a below which guide rollers 16 and 17 rotatable about vertical axes are pivotally supported are fixed at the front end of the front load bar unit 12a and the rear end of the rear load bar unit 12*c*. Connecting members 20*a* and 20*b*, and 21*a* and 21*b* vertically overlapping each other, whose overlapped portions are united so as to be horizontally bendable about vertical spindles 18*a* and 18*a* to whose lower ends guide rollers 18 and 19 are attached, are fixed at the rear end of the front load bar unit 12*a* and the front end of the central load bar unit 12*b*, and the rear end of the central load bar unit 12*b* and the front end of the rear load bar unit 12*c*. Where the respective load bar units 12*a* to 12*c* are on a straight line, both left and right lateral surfaces of the load bar unit 12*a* to 12*c* each including the bearing members 16*a* and 17*b* and the connecting members 20*a* to 21*b* are configured to form friction drive surfaces 22*a* and 22*b* continuing on a straight line over the entire length of the friction drive load bar 11.

The respective load bar units 12*a* to 12*c* of the thus configured friction drive load bar 11 are respectively attached to the carriage units 2 to 4 of the conveying carriage 1 via the mounting plates 13 to 15 in the above manner. As a result, when the respective carriage units 2 to 4 are in a straightforward posture of being located in series with both front and rear lateral sides thereof adjoining each other, the whole of the friction drive load bar 11 is positioned on a straight line parallel to the moving direction of the conveying carriage 1, and axes of the respective guide rollers 16 to 19 are also positioned on a straight line parallel to the moving direction of the conveying carriage 1. Resultingly, the respective carriage units 2 to 4 are connected horizontally bendable about axes of the vertical spindles 18*a* and 19*a* of the guide rollers 18 and 19, that is, joint axes 18*b* and 19*b* positioned coincide with the lower side of the both front and rear ends of the central carriage unit 2.

The foregoing pair of left and right guide rails 5*a* and 5*b* and a moving direction controlling guide rail 24 constituted of a pair of left and right rail members 23*a* and 23*b* sandwiching the respective guide rollers 16 to 19 of the friction drive load bar 11 from both left and right lateral sides are laid on the moving path of the conveying carriage 1. Further, a friction drive means 25 is arranged at a necessary place in the moving path of the conveying carriage 1. The friction drive means 25 has a structure of sandwiching the friction drive load bar 11 of the conveying carriage 1 side from both left and right lateral sides by a motor-driven friction drive wheel 26 and a back-up roller 27. The back-up roller 27 is pivotally supported at a fixed position so as to be rotatable about a vertical spindle. The friction drive wheel 26 rotatable about a vertical spindle and a motor 26*a* rotation-driving the friction drive wheel 26 are supported by a movable body 29 pivotally supported horizontally and swingably about a vertical spindle 28. The friction drive means 25 is provided with a biasing means 30 biasing the movable body 29 to such a direction that the friction drive wheel 26 approaches the back-up roller 27 side. A spring or a fluid pressure cylinder unit as shown, etc., is used as the biasing means 30.

This kind of friction drive means 25 is well-known. The friction drive means 25 is provided at an entrance and an exit of a pushing drive zone out of a linear travel zone in the moving path of the conveying carriage 1. In the pushing drive zone, each conveying carriage 1 is pushed by a following conveying carriage 1 and traveled. In a zone where the conveying carriages 1 are traveled at an appropriate interval, the friction drive means 25 are arranged at an interval slightly shorter than the entire length of the conveying carriage 1, that is, the entire length of the friction drive load bar 11. Thus, at the linear travel zone in the moving path of the conveying carriage 1, the conveying carriage 1 with the front end of the friction drive load bar 11 (the front end of the front load bar unit 12*a*) entered between the motor-driven friction drive wheel 26 and back-up roller 27 of the friction drive means 25 is subjected to thrust in an advancing direction by a frictional force between the rotating friction drive wheel 26 and the friction drive surface 22*a* of the friction drive load bar 11, and advances and travels. At that moment, the respective guide rollers 16 to 19 at the both front and rear ends and intermediate joint axes positions of the friction drive load bar 11 are engaged with the moving direction controlling guide rail 24 laid along the moving direction of the conveying carriage 1. Therefore, the conveying carriage 1 linearly travels in parallel with the moving direction controlling guide rail 24.

Accordingly, the guide rails 5*a* and 5*b* for the respective caster wheels 6 to 8 of the conveying carriage 1 have only to have a flat surface which rollably supports the caster wheels 6 to 8 simply. As a matter of course, the respective caster wheels 6 to 8 can be configured to roll on a flat bottom surface without using the guide rails 5*a* and 5*b* on the occasion when the moving direction controlling guide rail 24 controlling the moving direction of the conveying carriage 1 via the respective guide rollers 16 to 19 of the friction drive load bar 11 is laid.

Next, the traveling of the conveying carriage 1 at a horizontal curved path section 31 provided in the moving path of the conveying carriage 1 will be described based on FIGS. 5 to 9. The horizontal curved path section 31 connects between an upstream linear moving path section 32 and a downstream linear moving path section 33 orthogonal to the linear moving path section 32. The horizontal curved path section 31 turns and moves the conveying carriage 1 in such an orientation that the lateral side at which the friction drive load bar 11 is located becomes the center side of turning. The foregoing friction drive means 25A and 25B are respectively provided at an entrance and an exit of the horizontal curved path section 31. The guide rails 5*a* and 5*b* at the horizontal curved path section 31 are shaped to have a width gradually wider from both ends of the horizontal curved path section 31 toward a middle position thereof so as to cover movement tracks of the respective caster wheels 6 to 8 of the conveying carriage 1 traveling the horizontal curved path section 31. However, a flat floor board can be stretched at the horizontal curved path section 31, instead of the guide rails 5*a* and 5*b*.

Figure 5:
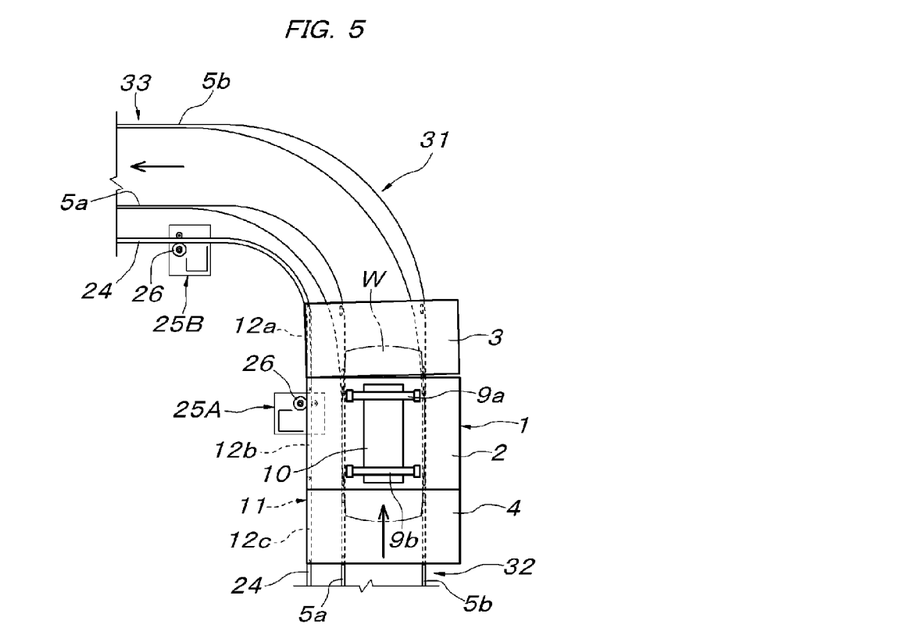
FIG. 5 is a plan view showing the first stage of a traveling state of the conveying carriage at a horizontal curved path section in the moving path of the conveying carriage.
Figure 6:
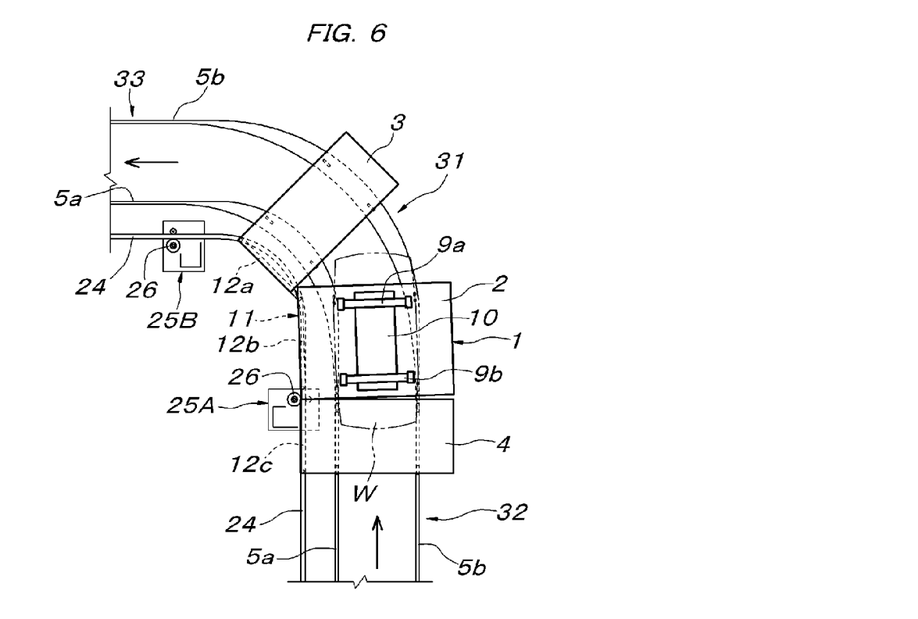
FIG. 6 is a plan view showing the second stage of the same.
Figure 7:
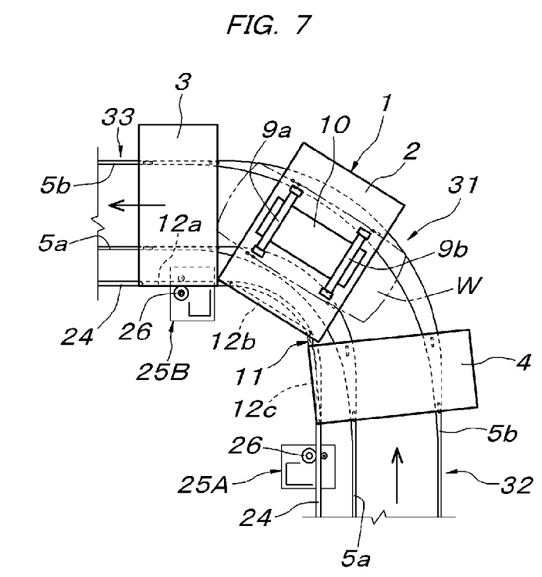
FIG. 7 is a plan view showing the third stage of the same.
Figure 8:
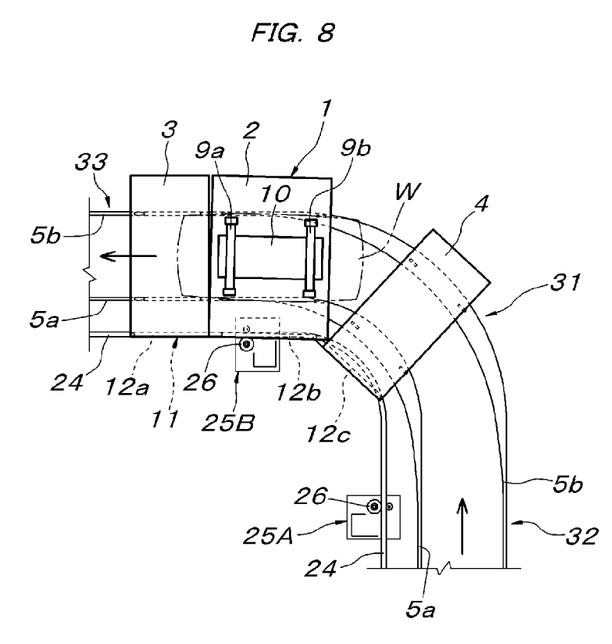
FIG. 8 is a plan view showing the fourth stage of the same.

As shown in FIG. 5 and FIG. 6, a conveying carriage 1 traveling the linear moving path section 32 toward the horizontal curved path section 31 by a friction drive means 25 just upstream from the friction drive means 25A at the entrance side of the horizontal curved path section 31 (or by pushing drive by a following conveying carriage 1) reaches the friction drive means 25A at the entrance side, thereafter being sent into the horizontal curved path section 31 by the friction drive means 25A. Slightly before the conveying carriage 1 reaches a position where the rear end of the friction drive load bar 11 thereof, that is, the rear end of the rear load bar unit 12*c* attached to the rear carriage unit 4 departs from the friction drive means 25A, the front end of the friction drive load bar 11 of the conveying carriage 1, that is, the front end of the front load bar unit 12*a* attached to the front carriage unit 3 already reaches the friction drive means 25B at the exit side of the horizontal curved path section 31. As shown in FIG. 7 and FIG. 8, the conveying carriage 1 is switched from a state driven by the friction drive means 25A to a state driven by the friction drive means 25B without pause. The conveying carriage 1 is sent out from the horizontal curved path section 31 to the downstream linear moving path section 33 by the friction drive means 25B in the order of the front carriage unit 3, the central carriage unit 2, and the rear carriage unit 4.

Figure 9:
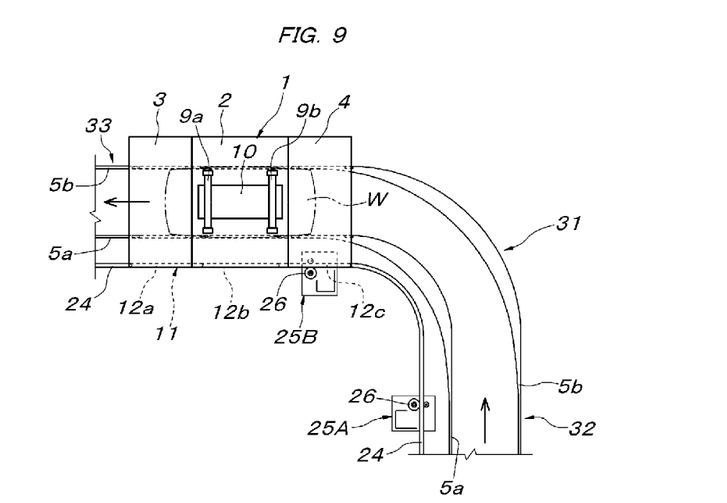
FIG. 9 is a plan view showing the fifth stage of the same.

When the conveying carriage 1 travels from the upstream linear moving path section 32 to the downstream linear moving path section 33 via the horizontal curved path section 31 as described above, the guide rollers 16 and 18 positioned at the both front and rear ends of the front load bar unit 12a attached to the front carriage unit 3, the guide rollers 18 and 19 positioned at the both front and rear ends of the central load bar unit 12b attached to the central carriage unit 2, and the guide rollers 19 and 17 positioned at the both front and rear ends of the rear load bar unit 12c attached to the rear carriage unit 4 move along the moving direction controlling guide rail 24 laid in a circular arc shape along the horizontal curved path section 31. Along with that, the respective carriage units 2 to 4 travel while being horizontally and relatively bent in a curve direction of the horizontal curved path section 31 with support points of the joint axis (the vertical spindle 18a) between the front load bar unit 12a and the central load bar unit 12b and the joint axis (the vertical spindle 19a) between the central load bar unit 12b and the rear load bar unit 12c. As shown in FIG. 9, the rear carriage unit 4 shifts from the horizontal curved path section 31 to the downstream linear moving path section 33, and the conveying carriage 1 again assuming the straightforward posture in which the respective carriage units 2 to 4 are located in series in parallel with the linear moving path section 33 is sent out to the downstream linear moving path section 33 by the friction drive means 25B at the exit side of the horizontal curved path section 31.

Figure 10:
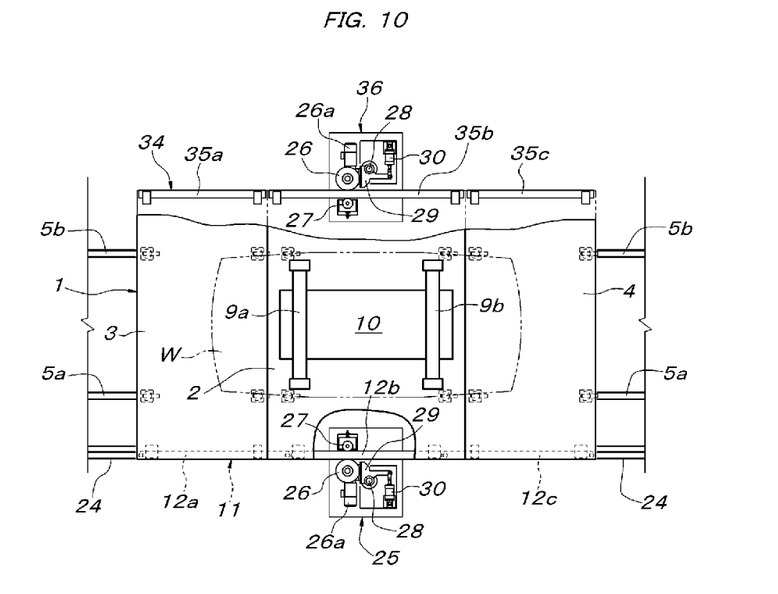
FIG. 10 is a partially cutaway plan view showing a second embodiment of the present invention.

In another embodiment of the present invention shown in FIG. 10, a second friction drive load bar 34 is provided at a lateral side portion opposite to the lateral side portion at which the foregoing friction drive load bar 11 of the conveying carriage 1 is located. The second friction drive load bar 34 is constituted of a front load bar unit 35a attached to the front carriage unit 3 of the conveying carriage 1, a central load bar unit 35b attached to the central carriage unit 2, and a rear load bar unit 35c attached to the rear carriage unit 4. The respective load bar units 35a to 35c have lengths approximately equal to the entire lengths of the respective carriage units 2 to 4 to be attached therewith. When the conveying carriage 1 is in the straightforward posture where the respective carriage units 2 to 4 are located in series, the load bar units 35a to 35c are located in series on a straight line parallel to the friction drive load bar 11. However, the load bar units 35a to 35c are not connected with each other as in the respective load bar units 12a to 12c of the friction drive load bar 11 or provided with guide rollers corresponding to the guide rollers 16 to 19.

At the linear moving path sections of the conveying carriage 1 provided with the second friction drive load bar 34, a second friction drive means 36 acting upon the second friction drive load bar 34 and propelling the conveying carriage 1 can be arranged, preferably, at a position bilaterally symmetrical to the friction drive means 25, aside from the friction drive means 25 acting upon the friction drive load bar 11 and propelling the conveying carriage 1. Since the second friction drive means 36 has a structure symmetric to the friction drive means 25, the same reference symbols will be given and a description thereof will be omitted.

The conveying carriage 1 is driven and traveled while being subjected to propulsive forces simultaneously from the friction drive means 25 and the second friction drive means 36 via the friction drive load bar 11 and the second friction drive load bar 34 at the both left and right lateral sides of the conveying carriage 1 at the linear moving path sections of the conveying carriage 1 in which the friction drive means 25 and the second friction drive means 36 are arranged in bilaterally symmetric positions as described above. Therefore, not only can the conveying carriage 1 be propelled strongly, but also can straight traveling stability of the conveying carriage 1 be secured. Therefore, the friction between the respective guide rollers 16 to 19 of the friction drive load bar 11 and the moving direction controlling guide rail 24 can be decreased as well. As a matter of course, the respective load bar units 35a to 35c constituting the second friction drive load bar 34 do not affect horizontal and relative bending movements of the respective carriage units 2 to 4 when the conveying carriage 1 travels the horizontal curved path section 31 as described above, since the respective load bar units 35a to 35c are not connected with each other.

In still another embodiment of the present invention shown in FIGS. 11 to 14, automatic connecting means 37a and 37b connecting the front and rear adjacent carriage units 2 to 4 together are provided at a lateral side portion opposite to the lateral side portion at which the foregoing friction drive load bar 11 of the conveying carriage 1 is located. The automatic connecting means 37a and 37b are constituted of a positionally fixed hook member 38, a swing arm 41 being vertically swingable about a left and right lateral and horizontal spindle 39 and having a distal end provided with an engaging portion 40 engageable and disengageable with respect to the hook member 38, and a spring 42 biasing and holding the swing arm 41 in an engaged posture with respect to the hook member 38.

In the shown example, the hook member 38 is attached below the front end of the carriage units 2 and 4 on the downstream side, and the swing arm 41 is attached below the rear end of the carriage units 3 and 2 on the upstream side. A further detailed description will be given. The swing arm 41 is constituted of a pair of left and right arm members 41a and 41b pivotally supported about the lateral and horizontal spindle 39 vertically and swingably while sandwiching a vertical bearing plate 43 hung from the carriage unit. The foregoing engaging portion 40 consists of a roller 40a self-rotatably supported between distal end portions of the paired left and right arm members 41a and 41b by a lateral and horizontal spindle 44. A cam follower roller 45 as an operated portion is supported at an extended end portion to one lateral side of the lateral and horizontal spindle 44. The spring 42 is composed of an extension coil spring stretched between a connecting plate 41c connecting the paired left and right arm members 41a and 41b with each other and a mounting plate 43a below which the bearing plate 43 protrudes. The bearing plate 43 is provided with a stopper portion 43b abutting against the connecting plate 41c in order to receive the swing arm 41 in the engaged posture with respect to the hook member 38.

Figure 11:
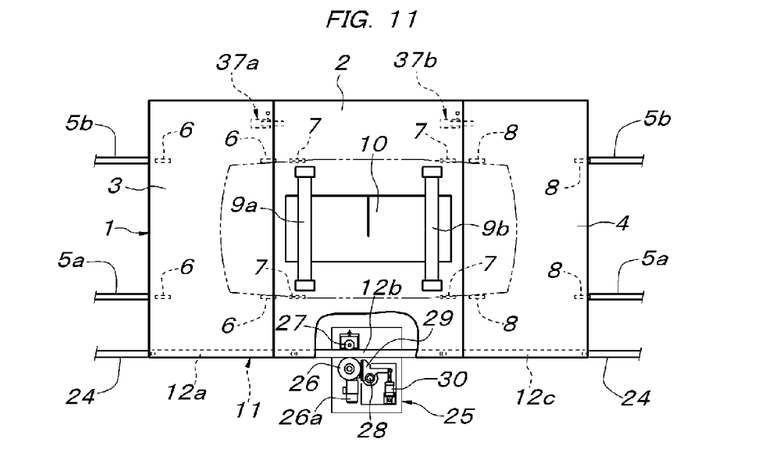
FIG. 11 is a partially cutaway plan view showing a third embodiment of the present invention.
Figure 12:
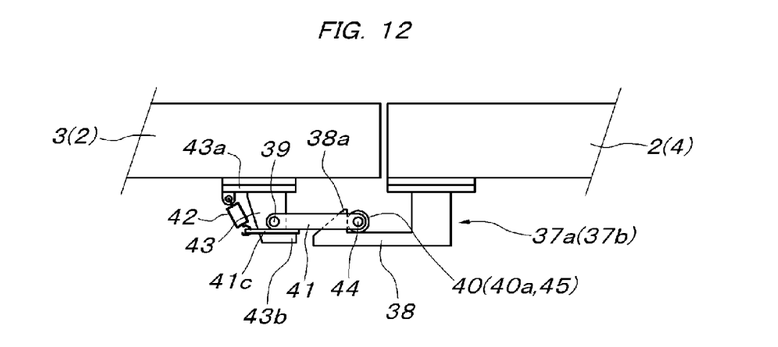
FIG. 12 is a side view showing a connected state of a connecting means of the third embodiment.

When the conveying carriage 1 is in the straightforward posture where the respective carriage units 2 to 4 are located in series as shown in FIG. 11, the above-configured automatic connecting means 37a and 37b are in a connected state where a check claw portion 38a at the distal end of the hook member 38 is fitted upward inside the engaging portion 40 (the roller 40a) of the swing arm 41 and between the paired left and right arm members 41a and 41b as shown in FIG. 12. At that moment, the swing arm 41 assumes a nearly horizontal posture and is supported by the stopper portion 43b of the bearing plate 43. When the automatic connecting means 37a and 37b are in the connected state as just described, the conveying carriage 1 is brought into a state that bending movements between the respective carriage units 2 to 4 are not possible.

Figure 13:
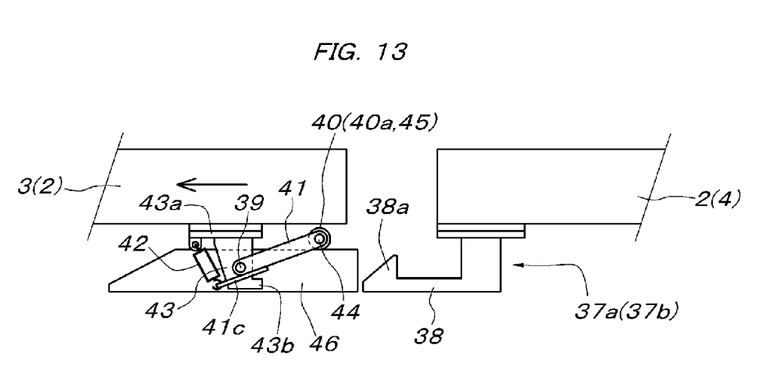
FIG. 13 is a side view showing a disengaged state of the connecting means of the third embodiment.
Figure 14:
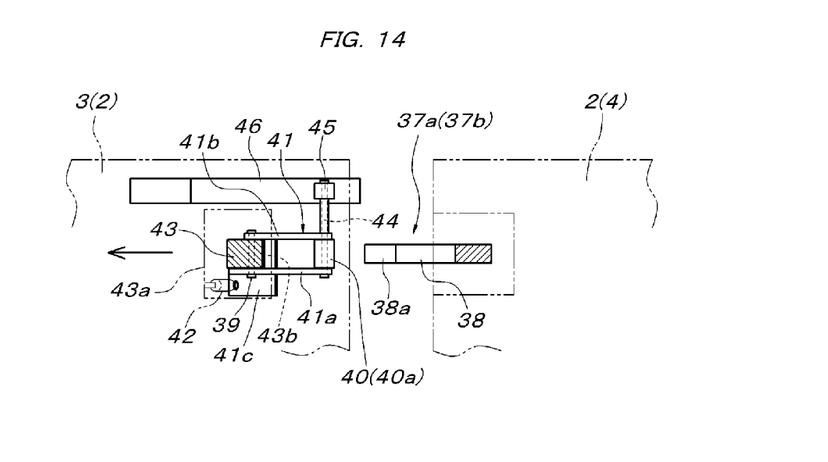
FIG. 14 is a cross-sectional plan view of FIG. 13.
Figure 15:
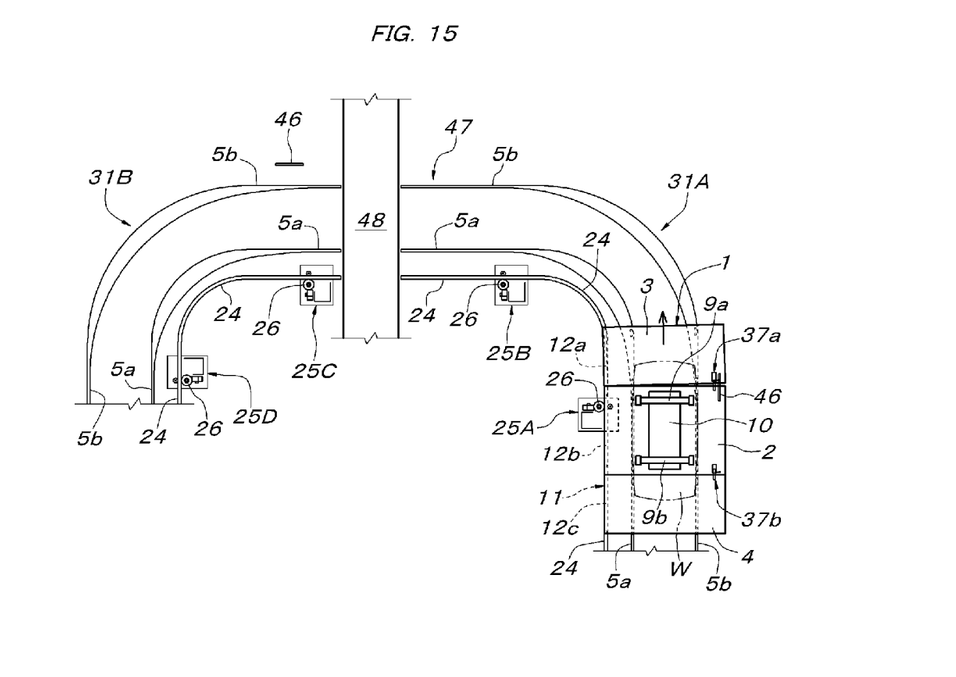
FIG. 15 is a plan view showing the first stage of a traveling state of a conveying carriage in an operation form of the third embodiment.
Figure 16:
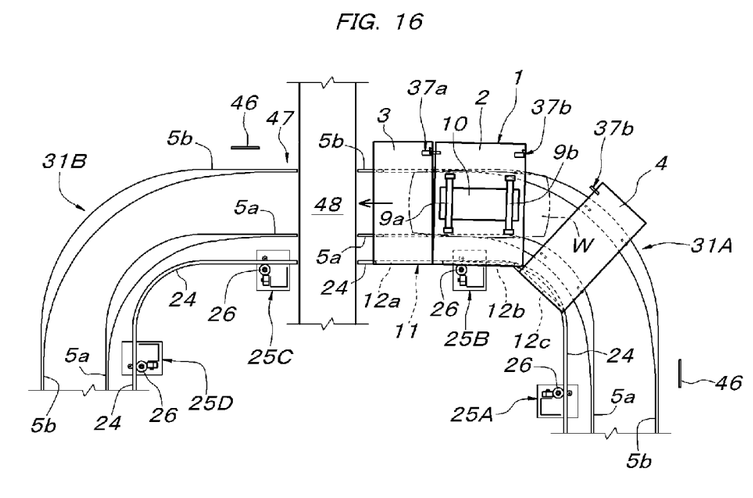
FIG. 16 is a plan view showing the second stage of the same.

At an operating point being set in the moving path of the conveying carriage 1 and switching the automatic connecting means 37a and 37b from the connected state to a disengaged state, there is laid a cam rail 46 for pushing up the cam follower roller 45 of the swing arm 41 of the automatic connecting means 37*a* and 37*b* in the connected state along with the traveling of the conveying carriage 1 and for maintaining such pushing-up state throughout a necessary path length, as shown in FIG. 13 and FIG. 14. Thus, when the conveying carriage 1 passes through the point where the cam rail 46 is laid, the cam follower roller 45 of the swing arm 41 of the connected automatic connecting means 37*a* and 37*b* gets on the cam rail 46, and the swing arm 41 moves upward about the lateral and horizontal spindle 39 against a biasing force of the spring 42, and the engaging portion 49 (the roller 40*a*) at the distal end of the swing arm is disengaged upward from the check claw portion 38*a* of the hook member 38 of the counterpart carriage unit, and the automatic connecting means 37*a* and 37*b* are switched from the connected state to the disengaged state.

In the disengaged state of the automatic connecting means 37*a* and 37*b*, the both front and rear carriage units 3 and 2, and 2 and 4 having been connected by the automatic connecting means 37*a* and 37*b* can move spaced apart from each other, as shown in FIG. 13 and FIG. 14. Therefore, the bending movements of the carriage units 2 to 4 are enabled. When the cam follower roller 45 of the swing arm 41 of the automatic connecting means 37*a* and 37*b* gets off of the cam rail 46 with the both front and rear carriage units 3 and 2, and 2 and 4 spaced apart from each other due to the bending movements, the swing arm 41 is returned to the original engaged posture by the biasing force of the spring 42 at a position forward away from the hook member 38 of the counterpart carriage unit. When the spaced-apart both front and rear carriage units 3 and 2, and 2 and 4 move closer to each other by return-direction bending movements in the above state, the engaging portion 40 of the swing arm 41 having been received in the horizontal posture by the stopper portion 43*b* is automatically fitted inside the check claw portion 38*a* of the hook member 38 of the counterpart carriage unit due to that the roller 40*a* of the engaging portion 40 gets on and passes through the check claw portion 38*a* of the hook member 38. Then, the automatic connecting means 37*a* and 37*b* are automatically returned to the original connected state.

An example of a use method of the conveying carriage 1 provided with the automatic connecting means 37*a* and 37*b* as above will be described in a layout, for example, in which a crossing passage 48 is provided to a linear moving path section 47 between two horizontal curved path sections 31A and 31B, as shown in FIGS. 15 to 19. The foregoing cam rail 46 is laid at an entrance side of the horizontal curved path section 31A, 31B each. Friction drive means 25A to 25D are juxtaposed at an interval slightly shorter than the entire length of the friction drive load bar 11 of the conveying carriage 1 such that each conveying carriage 1 can be individually driven and traveled continuously through the horizontal curved path section 31A, the linear moving path section 47, and the horizontal curved path section 31B in this order. In the layout of the shown example, the length of the linear moving path section 47 is short. Thus, the friction drive means 25B at the exit side of the horizontal curved path section 31A and the friction drive means 25C at the entrance side of the horizontal curved path section 31B are used also as means to drive the conveying carriage 1 at the linear moving path section 47. The guide rails 5*a* and 5*b* to form the moving path of the conveying carriage 1 and the moving direction controlling guide rail 24 are not laid on the crossing passage 48. The respective caster wheels 6 to 8 of the conveying carriage 1 are configured to roll on a floor surface of the crossing passage 48 formed flush with the rolling surfaces for the caster wheels of the guide rails 5*a* and 5*b* having been split by the crossing passage 48.

The motion of the conveying carriage 1 at the time of traveling and passing through the horizontal curved path sections 31A and 31B while being subjected to drive actions of the friction drive means 25A and 25B, and 25C and 25D in the foregoing configuration is as already described in detail based on FIGS. 5 to 9. When the conveying carriage 1 enters into each horizontal curved path section 31A, 31B, the cam rail 46 switches the automatic connecting means 37*a* and 37*b* from the connected state to the disengaged state immediately before the front carriage unit 3 and the central carriage unit 2, and the central carriage unit 2 and the rear carriage unit 4 respectively connected by the connecting means 37*a* and 37*b* start their bending movements along the horizontal curved path section 31A, 31B. Therefore, the conveying carriage 1 can travel and pass through each horizontal curved path section 31A, 31B without problems along with the bending movements of the respective carriage units 2 to 4. The cam follower roller 45 of the swing arm 41 gets off of the cam rail 46, whereupon the automatic connecting means 37*a* and 37*b* come into an automatically connectable state from the disengaged state. In that state, the conveying carriage 1 comes to travel the horizontal curved path section 31A, 31B.

The conveying carriage 1 enters into a downstream linear moving path section from the horizontal curved path sections 31A and 31B, thereupon being transformed into the straightforward posture in which the respective carriage units 2 to 4 are located in series. When the both front and rear carriage units 3 and 2, and 2 and 4 having been in a spaced apart state due to the bending approach and adjoin each other, the automatic connecting means 37*a* and 37*b* are automatically switched from the disengaged state to the connected state as described above. By these automatic connecting means 37*a* and 37*b*, the both front and rear carriage units 3 and 2, and 2 and 4 are connected with each other and integrated.

Figure 17:
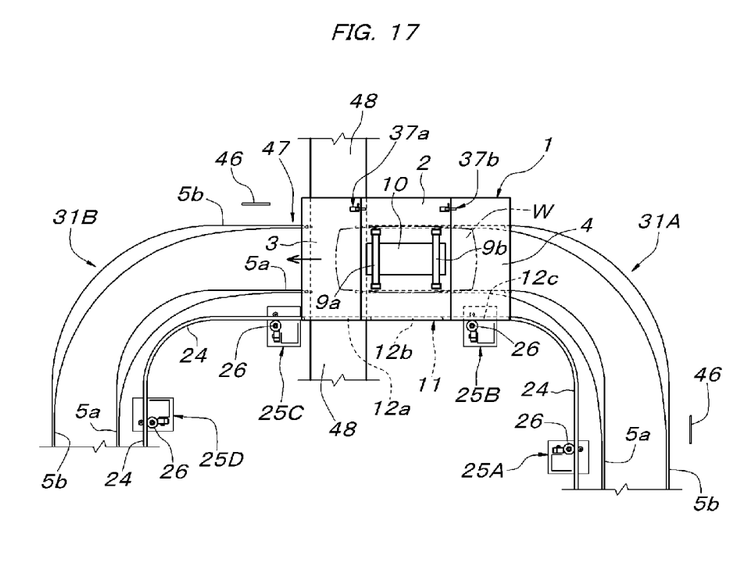
FIG. 17 is a plan view showing the third stage of the same.
Figure 18:
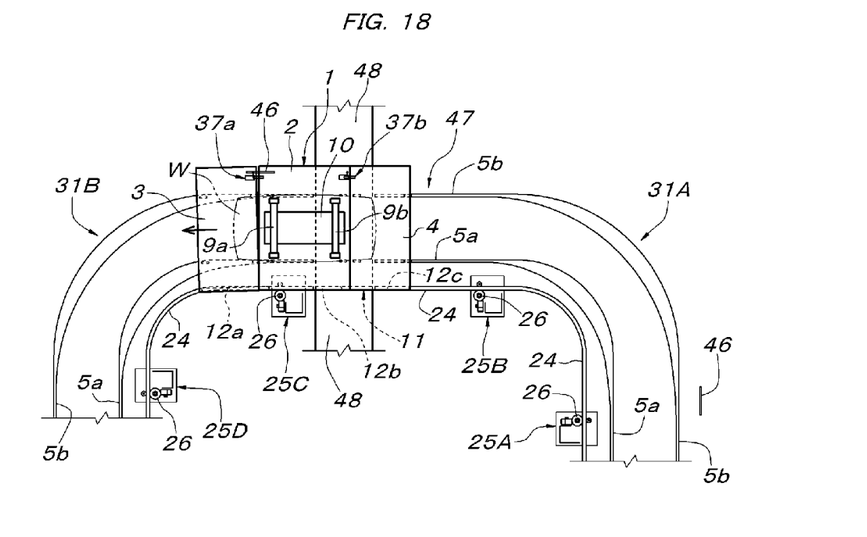
FIG. 18 is a plan view showing the fourth stage of the same.
Figure 19:
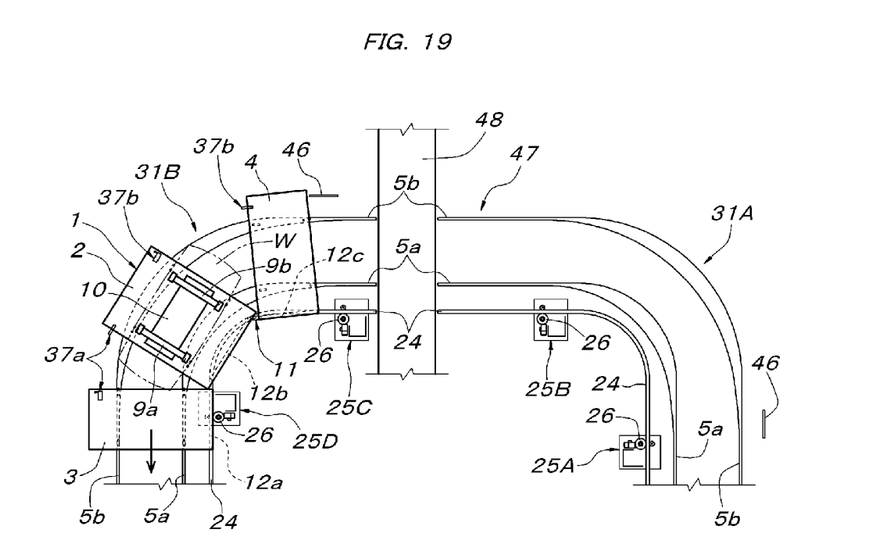
FIG. 19 is a plan view showing the fifth stage of the same.

Accordingly, in a process in which the conveying carriage 1 having been sent out in the straightforward posture by the friction drive means 25B from the horizontal curved path section 31A to the linear moving path section 47 is sent into the next horizontal curved path section 31B by the friction drive means 25C, a situation arises that when the respective carriage units 2 to 4 of the conveying carriage 1 travel and pass through the crossing passage 48 in sequence, the front carriage unit 3 passes through the crossing passage 48 while pushed by the central carriage unit 2 and the rear carriage unit 4 driven by the rear side friction drive means 25B as shown in FIG. 17, but the central carriage unit 2 and the rear carriage unit 4 pass through the crossing passage 48 not provided with the moving direction controlling guide rail 24 while pulled by the front carriage unit 3 driven by the front side friction drive means 25C as shown in FIG. 18. In such situation as well, the central carriage unit 2 and the rear carriage unit 4 are connected with the front carriage unit 3 and the central carriage unit 2 via the automatic connecting means 37*a* and 37*b*, so that the central carriage unit 2 and the rear carriage unit 4 traveling on the crossing passage 48 while towed by the front carriage unit 3 and the central carriage unit 2 located at the front side thereof can travel and pass through the crossing passage 48 without problems while keeping the straightforward posture, without involving horizontal swinging movements about the joint axes 18*b* and 19*b*.

It is noted that the swing arm 41 in the automatic connecting means 37*a* and 37*b* is configured to be capable of being held in a horizontal connected posture and an upward disengaged posture in an alternative way, for example, by using a two-position switching spring, and then can constitute connecting means using both the cam rail 46 switching from the horizontal connected posture to the upward disengaged posture and a cam rail reversely switching from the upward disengaged posture to the horizontal connected posture.

The friction drive carriage-type conveying apparatus of the present invention can be utilized as a friction drive carriage-type conveying apparatus suitable for assembling work with respect to an automobile vehicle body in an automobile assembly line in a state that a worker is on a conveying carriage which supports the vehicle body.

What is claimed is:

1. A friction drive carriage-type conveying apparatus comprising:
a conveying carriage having a friction drive load bar provided in parallel with a moving direction so as to continue over an entire length of the conveying carriage; and
a friction drive means arranged on a moving path side of the conveying carriage and having a friction drive wheel pressure-contacting with the friction drive load bar,
wherein the conveying carriage is constituted of a plurality of carriage units located in series in the moving direction of the conveying carriage,
the respective carriage units have the same width and have wheels for moving independently at both the left and right lateral side portions thereof,
the respective carriage units are connected at one of left and right lateral side portions of the conveying carriage in a straightforward posture so as to be horizontally bendable about vertical joint axes positioned on a straight line parallel to the moving direction,
the friction drive load bar is constituted of a plurality of load bar units divided for every carriage unit, and
the respective load bar units are fixed below the corresponding carriage units at positions on the straight line and are supported by the corresponding carriage units, and the respective load bar units are horizontally bendable about the joint axes between the carriage units.

2. The friction drive carriage-type conveying apparatus according to claim 1, wherein the respective load bar units of the friction drive load bar are connected horizontally bendable by vertical spindles concentric with the joint axes between the carriage units, the respective carriage units of the conveying carriage are connected with the load bar units having been attached thereto, via the vertical spindles so as to be horizontally bendable, and the vertical spindles between the load bar units are arranged at positions of coinciding with either front or rear adjacent carriage units rather than positions between the front and rear carriage units.

3. The friction drive carriage-type conveying apparatus according to claim 1, wherein guide rollers rotatable about vertical axes are pivotally supported to the friction drive load bar at both end portions thereof and the joint axes positions in between, respectively, and a guide rail with which the respective guide rollers are engaged is arranged on the moving path side of the conveying carriage.

4. The friction drive carriage-type conveying apparatus according to claim 1, wherein the conveying carriage is composed of three carriage units located in series, and the central carriage unit is provided with a conveyed object support base and an elevation drive means for the conveyed object support base, and both the front and rear carriage units are provided with work floor surfaces projecting further forward and rearward than both front and rear ends of a conveyed object having been supported on the conveyed object support base, and the elevation drive means is protrudingly provided below the central carriage unit at a position away from the load bar unit attached to the central carriage unit toward a carriage center.

5. The friction drive carriage-type conveying apparatus according to claim 1, wherein the conveying carriage is provided with a second friction drive load bar at a lateral side portion opposite to the lateral side portion to which the friction drive load bar is attached, and the second friction drive load bar is composed of load bar units separately attached to the respective carriage units so as to be located in series on a straight line parallel to the moving direction at the time when the conveying carriage is in the straightforward posture, and a second friction drive means acting upon the second friction drive load bar is arranged at a linear moving path section in the moving path of the conveying carriage, aside from the friction drive means.

6. A friction drive carriage-type conveying apparatus according to claim 1, wherein the conveying carriage is provided with a connectable and disengageable connecting means capable of connecting front and rear adjacent carriage units with each other at a lateral side portion opposite to the lateral side portion to which the friction drive load bar is attached, and an operation means switching the connecting means to a disengaged state is arranged at least before a horizontal curved path section in the moving path of the conveying carriage.

7. The friction drive carriage-type conveying apparatus according to claim 6, wherein the connecting means comprises an automatic connecting means automatically switched to a connected state when the front and rear carriage units are returned to the straightforward posture from a bent posture of swinging about the joint axis, and the connecting means is provided with an operated portion for switching from the connected state to the disengaged state, and a cam rail operating the operated portion and switching the automatic connecting means from the connected state to the disengaged state is arranged at least at a transitional zone from the linear moving path section to the horizontal curved path section in the moving path of the conveying carriage.

8. A friction drive carriage-type conveying apparatus comprising:
a conveying carriage having a friction drive load bar provided in parallel with a moving direction so as to continue over an entire length of the conveying carriage; and
a friction drive means arranged on a moving path side of the conveying carriage and having a friction drive wheel pressure-contacting with the friction drive load bar,
wherein the conveying carriage is constituted of a plurality of carriage units located in series in the moving direction of the conveying carriage,
the respective carriage units are connected at one of left and right lateral side portions of the conveying carriage in a straightforward posture so as to be horizontally bendable about vertical joint axes positioned on a straight line parallel to the moving direction,
the friction drive load bar is constituted of a plurality of load bar units divided for every carriage unit,
the load bar units are attached to the corresponding carriage units at positions on the straight line are horizontally bendable about the joint axes between the carriage units,
the conveying carriage being provided with a second friction drive load bar at a lateral side portion opposite to the lateral side portion to which the friction drive load bar is attached,
the second friction drive load bar being composed of load bar units separately attached to the respective carriage units so as to be located in series on a straight line parallel to the moving direction at the time when the conveying carriage is in the straightforward posture, and a second friction drive means acting upon the second friction drive load bar being arranged at a linear moving path section in the moving path of the conveying carriage, aside from the friction drive means.

9. A friction drive carriage-type conveying apparatus comprising:
 a conveying carriage having a friction drive load bar provided in parallel with a moving direction so as to continue over an entire length of the conveying carriage; and
 a friction drive means arranged on a moving path side of the conveying carriage and having a friction drive wheel pressure-contacting with the friction drive load bar,
 wherein the conveying carriage is constituted of a plurality of carriage units located in series in the moving direction of the conveying carriage,
 the respective carriage units are connected at one of left and right lateral side portions of the conveying carriage in a straightforward posture so as to be horizontally bendable about vertical joint axes positioned on a straight line parallel to the moving direction,
 the friction drive load bar is constituted of a plurality of load bar units divided for every carriage unit,
 the load bar units are attached to the corresponding carriage units at positions on the straight line are horizontally bendable about the joint axes between the carriage units,
 the conveying carriage being provided with a connectable and disengageable connecting means capable of connecting front and rear adjacent carriage units with each other at a lateral side portion opposite to the lateral side portion to which the friction drive load bar is attached, and
 an operation means switching the connecting means to a disengaged state being arranged at least before a horizontal curved path section in the moving path of the conveying carriage.

10. The friction drive carriage-type conveying apparatus according to claim 9, wherein the connecting means comprises an automatic connecting means automatically switched to a connected state when the front and rear carriage units are returned to the straightforward posture from a bent posture of swinging about the joint axis, and the connecting means is provided with an operated portion for switching from the connected state to the disengaged state, and a cam rail operating the operated portion and switching the automatic connecting means from the connected state to the disengaged state is arranged at least at a transitional zone from the linear moving path section to the horizontal curved path section in the moving path of the conveying carriage.

* * * * *